United States Patent
Wu et al.

(10) Patent No.: US 8,111,528 B2
(45) Date of Patent: Feb. 7, 2012

(54) DC TO AC INVERTER

(76) Inventors: Chin-Chang Wu, Kaohsiung (TW);
Chun-Han Chen, Kaohsiung (TW);
Ming-Sheng Kao, Kaohsiung (TW);
Li-Hsiang Lai, Kaohsiung (TW);
Ya-Tsung Feng, Kaohsiung (TW)

( * ) Notice: Subject to any disclaimer, the term of this patent is extended or adjusted under 35 U.S.C. 154(b) by 355 days.

(21) Appl. No.: 12/583,867

(22) Filed: Aug. 27, 2009

(65) Prior Publication Data
US 2010/0254170 A1     Oct. 7, 2010

(30) Foreign Application Priority Data
Apr. 6, 2009 (TW) ................................ 98111339 A

(51) Int. Cl.
*H02M 5/45* (2006.01)
(52) U.S. Cl. ..................... 363/37; 323/207; 315/224
(58) Field of Classification Search .......... 363/16–20, 363/34–39, 41–46, 89, 95, 134; 323/207, 323/222, 224, 225, 282, 285, 288; 307/44, 307/45, 64, 66, 82, 107; 315/206, 219, 224, 315/291, 307
See application file for complete search history.

(56) References Cited

U.S. PATENT DOCUMENTS

| 4,823,247 | A  | * | 4/1989  | Tamoto ........................... 363/16 |
| 4,827,151 | A  | * | 5/1989  | Okado ............................ 307/66 |
| 5,341,067 | A  | * | 8/1994  | Nilssen ..................... 315/209 R |
| 5,519,306 | A  | * | 5/1996  | Itoh et al. ...................... 323/222 |
| 7,466,082 | B1 | * | 12/2008 | Snyder et al. ............. 315/200 A |
| 7,898,110 | B2 | * | 3/2011  | Song .............................. 307/66 |

* cited by examiner

*Primary Examiner* — Rajnikant Patel

(57) ABSTRACT

A DC to AC inverter has a DC power input port, a buck converter, a buck/boost converter, an output filter and an AC output port. The DC power input port has a positive input terminal and a negative input terminal, both connected to a DC source. The AC output port is connected to a single-phase utility system. When the single-phase utility system is in positive half cycle, the buck converter generates a positive half-cycle signal of sinusoidal current. When the single-phase utility system is in negative half cycle, the buck/boost converter generates a negative half-cycle signal of sinusoidal current. In either the positive or negative half cycles, only one power electronic switch is switched in high frequency to reduce switching loss. Further, the negative input terminal of the DC power input port of the invention can be connected to a neutral line of the single-phase utility system.

10 Claims, 9 Drawing Sheets

DC TO AC INVERTER

BACKGROUND OF THE INVENTION

1. Field of the Invention

The invention relates to a DC to AC inverter and, in particular, to a DC to AC inverter that can reduce switching loss and increase system efficiency and a negative input terminal of a DC power input port can be directly connected to the neutral line of a single-phase utility system.

2. Description of Related Art

The wide use of fossil fuels has resulted in the problem of greenhouse emissions worldwide, which has also seriously damaged the earth's environment. Moreover, fossil fuels will be exhausted in the future, and the cost of fossil fuels has significantly increased recently. Governments worldwide expect to develop renewable energy to alleviate the above problems. Therefore, it has become a trend to look for green energy in place of fossil energy. This results in the interest in developing solar power, wind power, and fuel cells. The grid-connected solar power system and wind power system are the important renewable power systems currently.

Taking the grid-connected solar power system as an example, the solar power system basically has a DC to DC converter, a DC to AC inverter and a controller. First, the DC to DC converter converts the power generated by the solar cell array to DC power. Then, the DC to AC inverter converts the DC power into AC power, and the AC power is then injected into the utility system. Therefore, a suitable circuit topology for the DC to AC inverter can increase the efficiency of entire power system, minimize the size, and reduce the cost.

With the advance in technology of semiconductor devices, many power electronic switches with high switching frequencies have been developed and used in power conversion equipment. However, these power electronic switches have switching loss and therefore reduce the efficiency. It is thus very important to design a circuit topology that can reduce switching loss and increase equipment efficiency for green energy power systems.

The design of the DC to AC inverter is very important for renewable energy generation systems. In a grid-connected renewable energy generation system, the DC to AC inverter is used to convert DC power into AC power and inject the AC power to the utility system. The output current of DC to AC inverter is a sinusoidal current that has the same phase as the utility system. The DC to AC inverters generally can be categorized as a half-bridge configuration and a full-bridge configuration. With reference to FIG. 1, a conventional half-bridge inverter mainly comprises a first power electronic switch $T_{A^+}$, a second power electronic switch $T_{A^-}$, and two equivalent DC capacitors. When the first power electronic switch $T_{A^+}$ is turned on and the second power electronic switch $T_{A^-}$ is turned off, the output voltage of the inverter is $$V_O = +\frac{V_d}{2}.$$

On the other hand, when the second power electronic switch $T_{A^-}$ is turned on and the first power electronic switch $T_{A^+}$ is turned off, the output voltage of the inverter is $$V_O = -\frac{V_d}{2}.$$

Therefore, turning the first power electronic switch $T_{A^+}$ and the second power electronic switch $T_{A^-}$ on and off alternately can control the inverter to output an AC voltage and thus a desired AC current. To achieve this purpose, $V_d/2$ has to be greater than the voltage amplitude of the utility system.

With reference to FIG. 2, a conventional full-bridge inverter comprises a first power electronic switch $T_{A^+}$, a second power electronic switch $T_{A^-}$, a third power electronic switch $T_{B^+}$ and a fourth power electronic switch $T_{B^-}$. When the first power electronic switch $T_{A^+}$ and the fourth power electronic switch $T_{B^-}$ are turned on while the second power electronic switch $T_{A^-}$ and the third power electronic switch $T_{B^+}$ are turned off, the output voltage of the inverter is $V_O=+V_d$. On the other hand, when the second power electronic switch $T_{A^-}$ and the third power electronic switch $T_{B^+}$ are turned on while the first power electronic switch $T_{A^+}$ and the fourth power electronic switch $T_{B^-}$ are turned off, the output voltage of the inverter is $V_O=-V_d$. When the first power electronic switch $T_{A^+}$ and the third power electronic switch $T_{B^+}$ are turned on while and the second power electronic switch $T_{A^-}$ and the fourth power electronic switch $T_{B^-}$ are turned off, or the second power electronic switch $T_{A^-}$ and the fourth power electronic switch $T_{B^-}$ are turned on while the first power electronic switch $T_{A^+}$ and the third power electronic switch $T_{B^+}$ are turned off, the output voltage of the inverter is $V_O=0$. Generally speaking, $V_d$ has to be greater than the voltage amplitude of the utility system. Therefore, by controlling the first power electronic switch $T_{A^+}$, the second power electronic switch $T_{A^-}$, the third power electronic switch $T_{B^+}$, and the fourth power electronic switch $T_{B^-}$ to turn on and off alternately, the inverter is controlled to output an AC voltage. Thus, a desired AC current can be output from the inverter.

For either full-bridge or half-bridge inverters, at lest two power electronic switches are switching in high-frequency at the same time. Therefore, there is a lot of switching loss. In a single-phase utility system, one of the power lines is the neutral line. In some application of renewable energy generation systems, such as that thin-film solar cell using amorphous-Si, the output voltage of solar cell array is directly connected to a DC power input port of the inverter. In practice, a negative input terminal of the DC power input port of the inverter has to be connected to the neutral line of the utility system. In the half-bridge or full-bridge inverter as shown in FIG. 1 or FIG. 2, the negative terminal on the DC side cannot be directly connected to the neutral line of the utility system. Therefore, when the half-bridge or full-bridge inverter is used in some of the renewable energy generation systems, an additional transformer is required for galvanic isolation. This results in increasing the cost and size, and decreasing the efficiency. Consequently, it is very important to develop a grid-connected inverter that has high efficiency and can directly connect the negative input terminal of its DC power input port to the neutral line of the utility system.

SUMMARY OF THE INVENTION

An objective of the invention is to provide a DC to AC inverter that has higher conversion efficiency, less switching loss, and the negative input terminal of whose DC power input port can directly connect to the neutral line of a usual power system.

To achieve the above-mentioned objective, the disclosed DC to AC inverter includes:

a DC power input port, which has a positive input terminal and a negative input terminal, both connected to a DC source;

a buck converter, which includes a buck converting circuit, an input terminal, an output terminal, and a common terminal, the input terminal and the common terminal both connecting to the positive input terminal and the negative input terminal of the DC power input port, respectively;

a buck/boost converter, which includes a buck/boost converting circuit, an input terminal, an output terminal, and a common terminal, with the input terminal, the output terminal, and the common terminal connecting to the input terminal, the common terminal, and the output terminal of the buck converter, respectively;

an output filter, which includes a filtering circuit, an input terminal, an output terminal, and a common terminal, with the input terminal connecting to the output terminal of the buck converter, the common terminal connecting to the common terminal of the buck converter, thereby filtering high-frequency harmonics generated by the buck converter and the buck/boost converter;

an AC output port, which includes an output terminal and a common terminal, both connecting to the output terminal and the common terminal of the output filter, respectively, wherein the AC output port is the output of the DC to AC inverter and connected to a single-phase utility system, with the common terminal of the AC output port connecting to a neutral line of the single-phase utility system.

The buck converter and the buck/boost converter operate alternately to generate an AC sinusoidal current, which is output by the AC output port to inject into the single-phase utility system. The buck converter produces the positive half-cycle signal of the AC sinusoidal current when the single-phase utility system is in positive half cycle. The buck/boost converter produces the negative half-cycle signal of the AC sinusoidal current when the single-phase utility system is in negative half cycle. In either the positive half cycle or negative half cycle of the single-phase utility system, only one power electronic switch is used to switch in high-frequency. This method can effectively reduce switching loss and increase energy conversion efficiency. The negative input terminal of the DC power input port directly connects to the neutral line of the single-phase utility system via the common terminal of the AC output port.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENT

Figure 1:
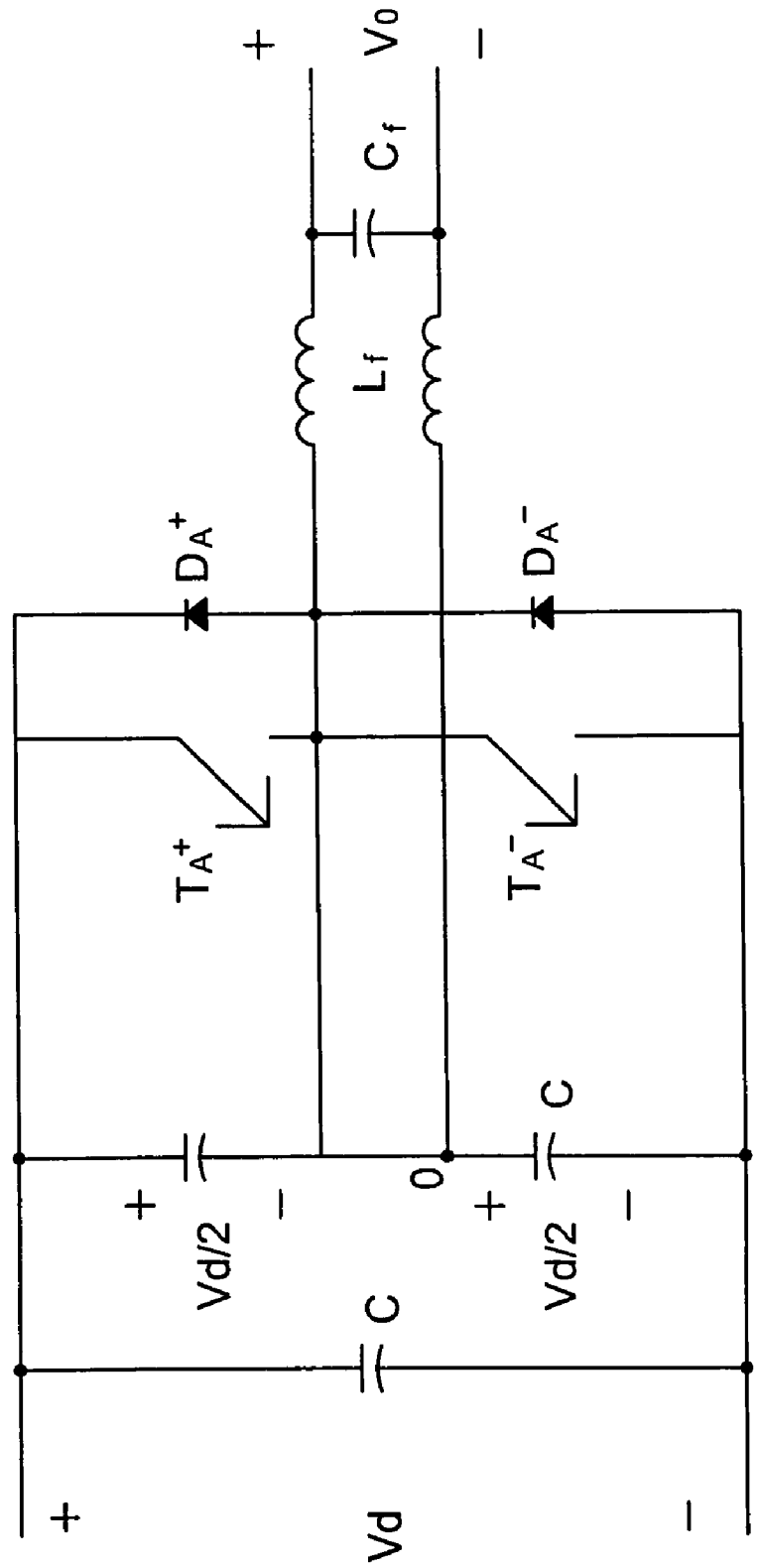
FIG. 1 is a circuit diagram of a conventional half-bridge converter.
Figure 2:
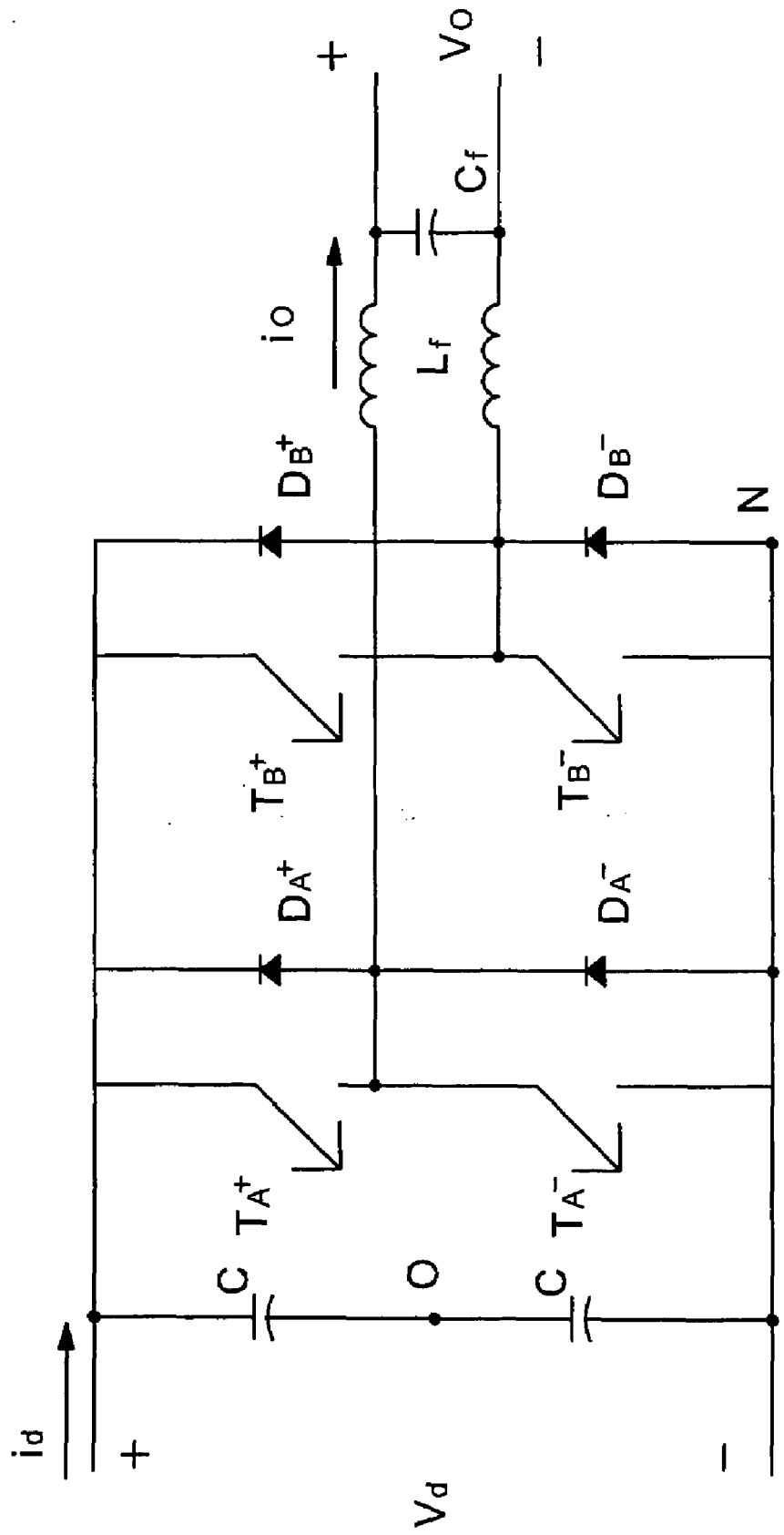
FIG. 2 is a circuit diagram of a conventional full-bridge converter.
Figure 3:
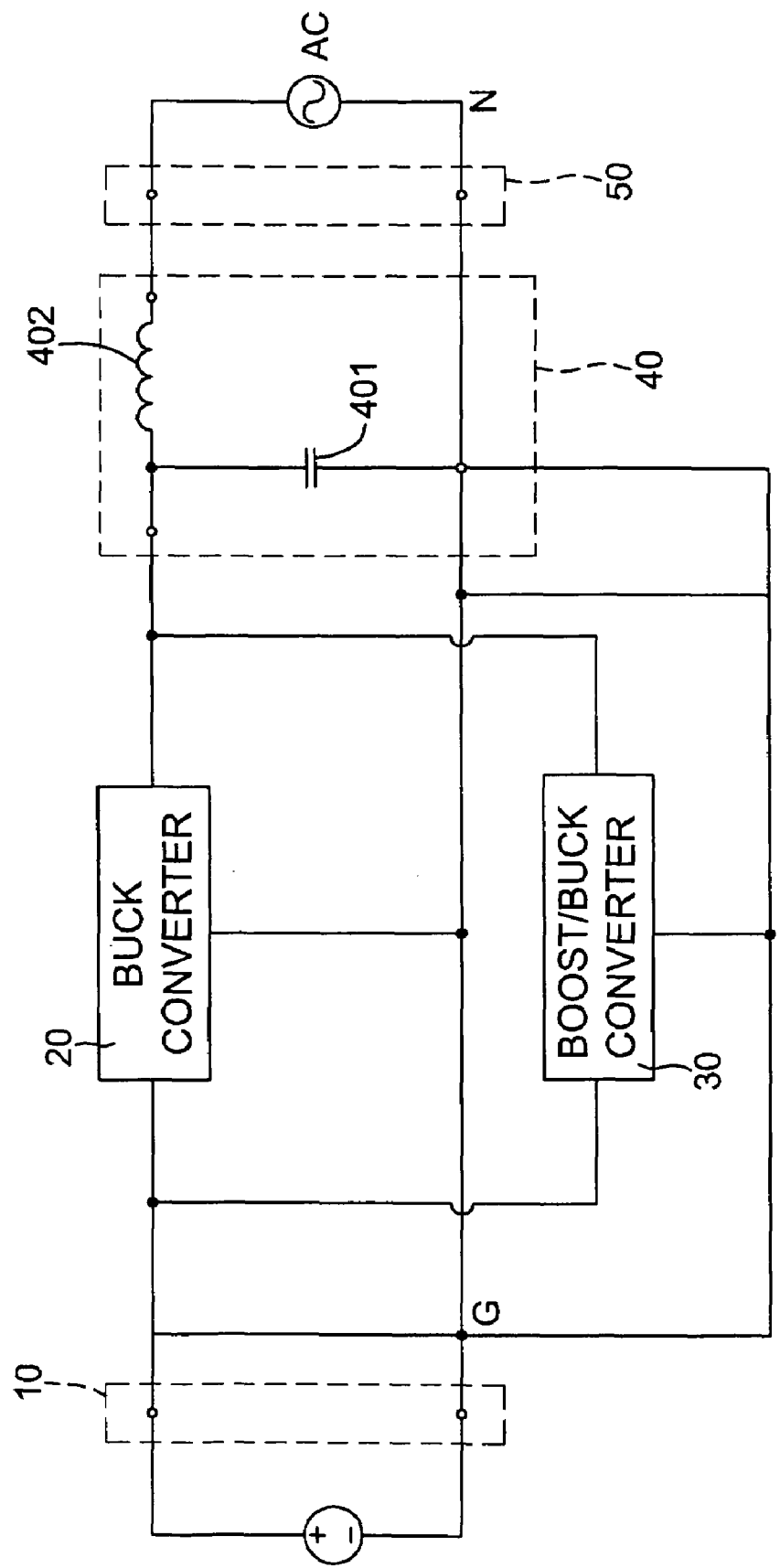
FIG. 3 is a circuit block diagram of a DC to AC inverter in accordance with the present invention.

With refer to FIG. 3, a DC to AC inverter in accordance with the present invention comprises a DC power input port (10), a buck converter (20), a buck/boost converter (30), an output filter (40), and an AC output port (50).

The DC power input port (10) includes a positive input terminal and a negative input terminal, both connecting to a DC source.

The buck converter (20) includes a buck converting circuit, an input terminal, an output terminal and a common terminal. The input terminal and the common terminal are connected to the positive input terminal and the negative input terminal of the DC power input port (10), respectively.

The buck/boost converter (30) includes a buck/boost converting circuit, an input terminal, an output terminal and a common terminal. The input terminal, the common terminal and the output terminal are connected to the input terminal, the common terminal and the output terminal of the buck converter (20), respectively.

The output filter (40) includes a filtering circuit, an input terminal, an output terminal and a common terminal. The input terminal is connected to the output terminal of the buck converter (20). The common terminal is connected to the common terminal of the buck converter (20). The output filter (40) filters high-frequency harmonics generated by the buck converter (20) and the buck/boost converter (30).

The AC output port (50) includes an output terminal and a common terminal respectively connected to the output terminal and the common terminal of the filter (40). The AC output port (50) functions as the output of the DC to AC inverter and is applied to connect to a single-phase utility system. The common terminal of the AC output port (50) is connected to a neutral line N of the single-phase utility system.

The buck converter (20) and the buck/boost converter (30) operate alternately to generate an AC sinusoidal current, which is then output to the single-phase utility system via the output filter (40) and the AC output port (50). The buck converter (20) produces the positive half-cycle signal of the AC sinusoidal current when the single-phase utility system is in positive half cycle. The buck/boost converter (30) produces the negative half-cycle signal of the AC sinusoidal current when the single-phase utility system is in negative half cycle. The filtering circuit of the output filter (40) comprises a capacitor (401) and an inductor (402). Both ends of the capacitor (401) are connected between the input terminal and the common terminal of the output filter (40). Both ends of the inductor (402) are connected between the input terminal and the output terminal of the output filter (40). As shown in FIG. 3, in the DC to AC inverter of the present invention, the neutral line N of the single-phase utility system is directly connected to the negative terminal of the DC source.

Figure 4:
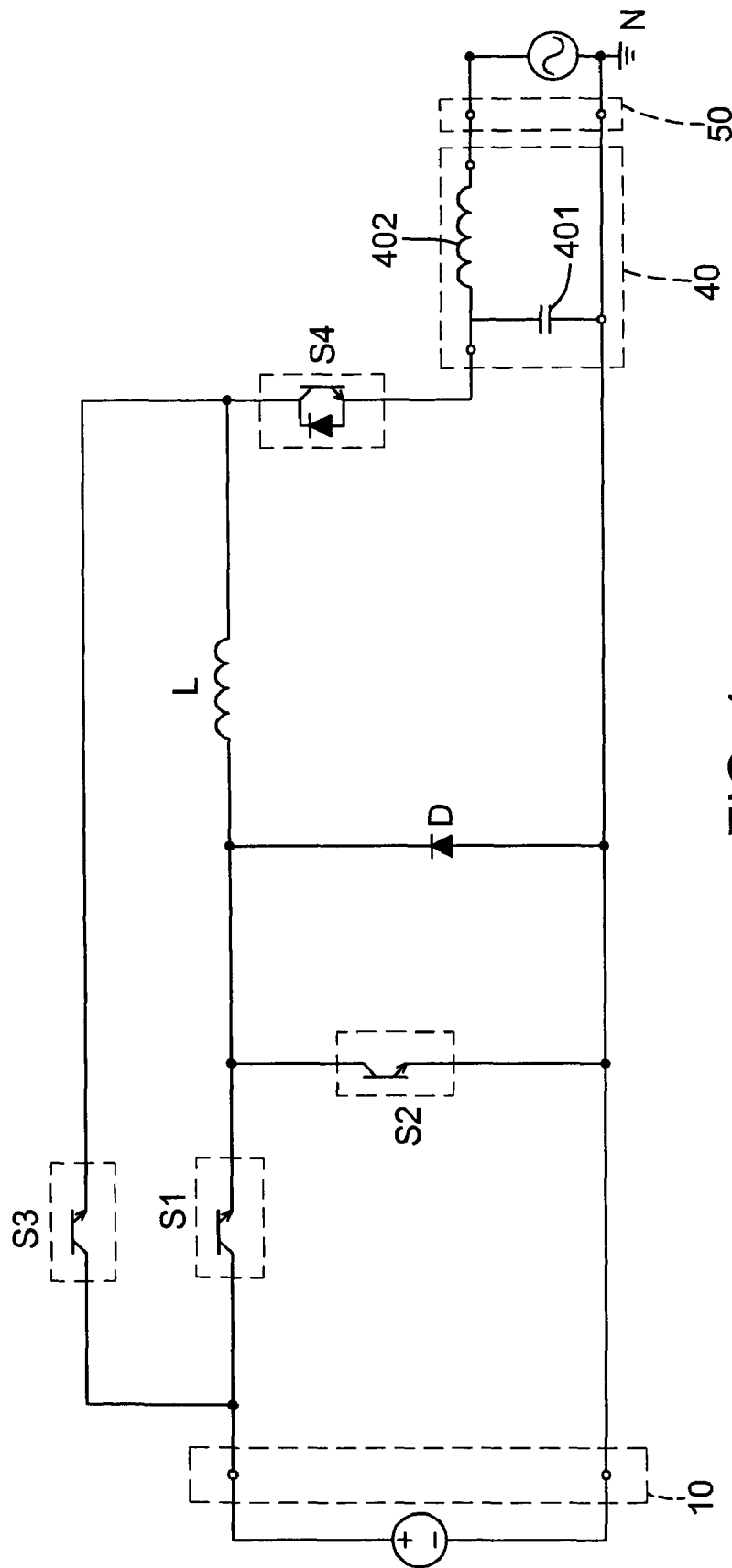
FIG. 4 is a circuit diagram of a first embodiment of the DC to AC inverter of the present invention.

With reference to FIG. 4, in the first embodiment of the DC to AC inverter, the buck converting circuit of the buck converter (20) and the buck/boost converting circuit of the buck/boost converter (30) commonly comprise first to fourth power electronic switches (S1)-(S4), a diode (D), and an energy storage inductor (L). The first power electronic switch (S1), the second power electronic switch (S2), and the third power electronic switch (S3) are made of power electronic switches. The fourth power electronic switch (S4) is configured by connecting a power electronic switch and a diode in parallel. The energy storage inductor (L) is shared by the buck converter (20) and the buck/boost converter (30).

A first end of the first power electronic switch (S1) is connected to the positive input terminal of the DC power input port (10), and a second end thereof is connected to a first end of the second power electronic switch (S2). A second end of the second power electronic switch (S2) and the first end of the diode (D) are first connected together, then connected to the negative input terminal of the DC power port (10). A second end of the diode (D) and a first end of the energy storage inductor (L) are connected. A first end of the third power electronic switch (S3) is connected to the positive input terminal of the DC power input port (10). A second end of the third power electronic switch (S3) is connected to a second end of the energy storage inductor (L) and a first end of the fourth power electronic switch (S4). A second end of the fourth power electronic switch (S4) is connected to the input terminal of the output filter (40). The common terminal of the output filter (40) is connected to the negative input terminal of the DC power input port (10). The output terminal and common terminal of the output filter (40) are connected to the AC output port (50). The AC output port (50) is then connected to the single-phase utility system through two power lines. One of the two power lines is the neutral line N that is connected to the ground in the single-phase utility system. As shown in FIG. 4, the neutral line of the single-phase utility system is directly connected to the negative terminal of the DC source. That is, in the DC to AC inverter of the first embodiment, the negative terminal of the DC source and the neutral line of the single-phase utility system are equal in potential.

By properly controlling the on and off sequences of the first to fourth power electronic switches (S1)-(S4), the DC power output from the DC source is converted into AC power to inject into the single-phase utility system. The output current of DC to AC inverter is sinusoidal and in phase with the single-phase utility system. In this embodiment, the first power electronic switch (S1) and the third power electronic switch (S3) use high-frequency pulse-width modulation (PWM) technique to control in positive and negative half cycles of the single-phase utility system, respectively. Only one power electronic switch is controlled by high-frequency PWM and switched in high frequency at the same time. The second power electronic switch (S2) and the fourth power electronic switch (S4) are controlled in square waves synchronously with the voltage of the single-phase utility system. The actions of the two circuits are detailed below.

A. Buck Converter

Figure 5A:
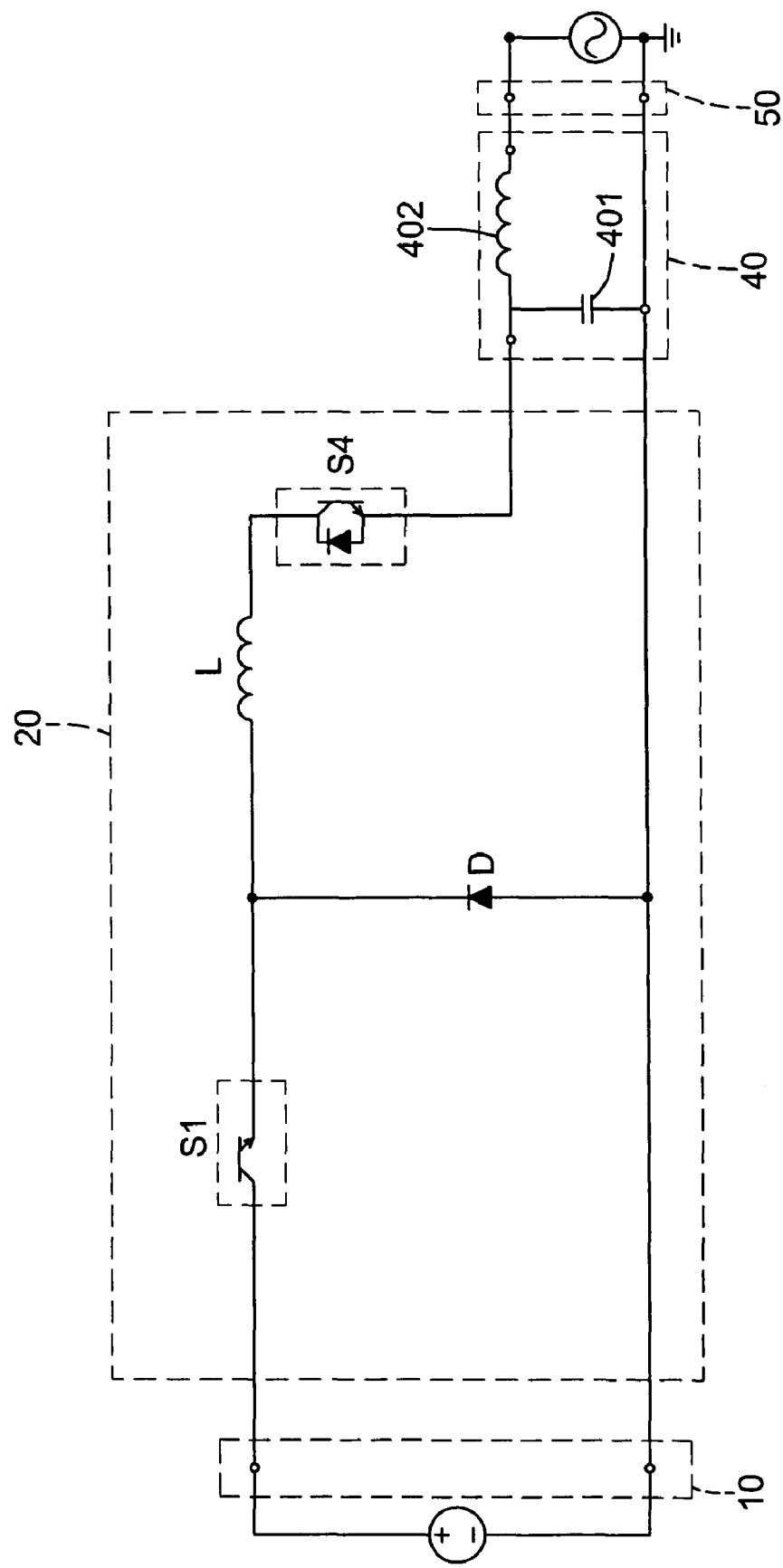
FIG. 5A shows the circuit operation of the buck converter in the first embodiment.

With reference to FIG. 5A, when the single-phase utility system is in positive half cycle, the second power electronic switch (S2) and the third power electronic switch (S3) remain off, equivalent to an open circuit, and the fourth power electronic switch (S4) remain on, equivalent to a short circuit. The DC to AC inverter is operated as the buck converter (20) shown in the drawing. The first power electronic switch (S1) is controlled to turn on and off alternately. When the first power electronic switch (S1) is turned on, the diode (D) becomes open because of the reversed bias. Since the voltage of the DC source is larger than the voltage amplitude of the single-phase utility system, the DC source provides energy to the energy storage inductor (L) to store energy therein and also to the single-phase utility system. The current on the energy storage inductor (L) increases. When the first power electronic switch (S1) is turned off, the diode (D) becomes short due to the forward bias. The energy storage inductor (L) releases the stored energy and supplies to the single-phase utility system via the diode (D). The current on the energy storage inductor (L) drops. Therefore, using the high-frequency PWM technique to control the first power electronic switch (S1) can control to generate the positive half-cycle signal of an AC sinusoidal current in the positive half cycle of the single-phase utility system and inject the AC sinusoidal current into the single-phase utility system.

B. Buck/Boost Converter

Figure 5B:
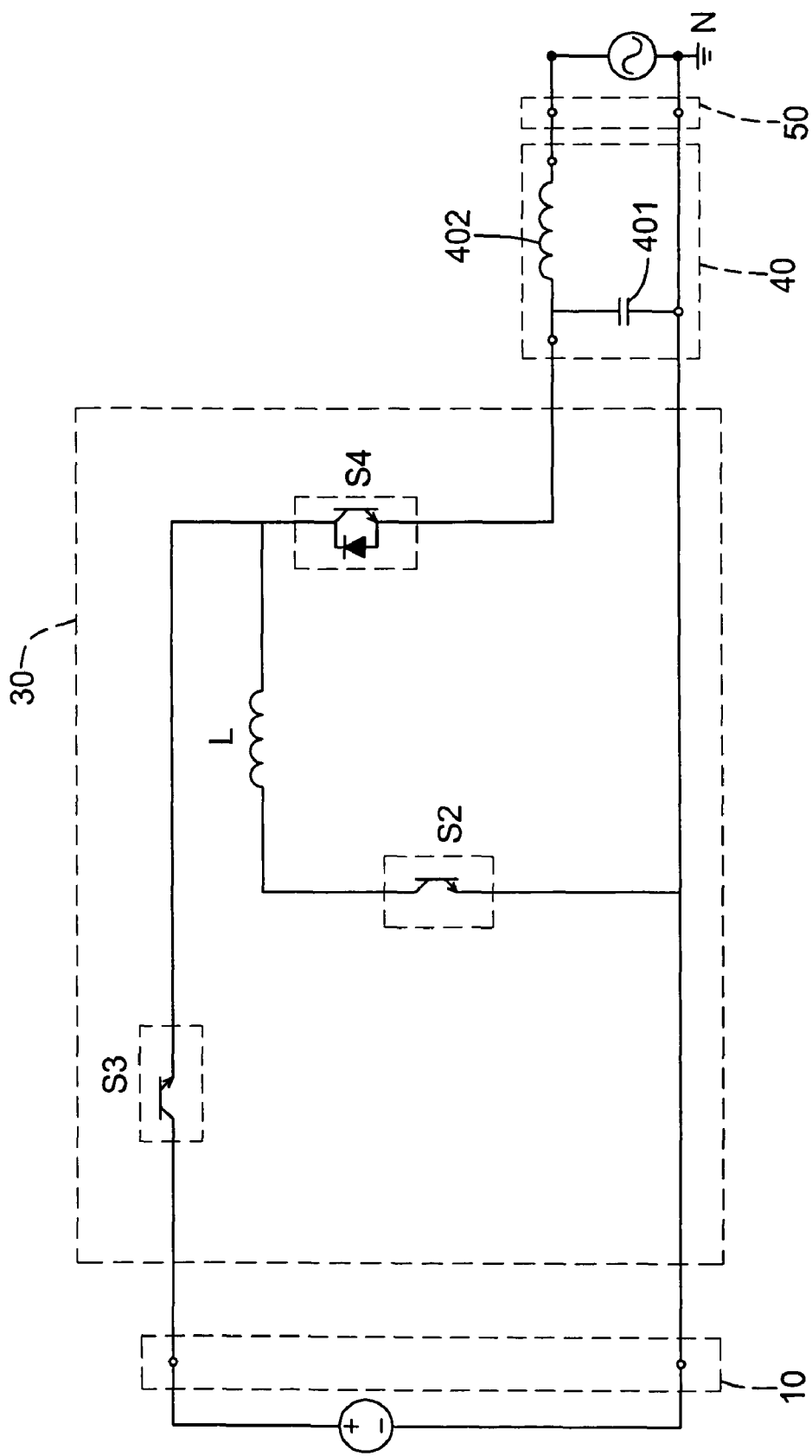
FIG. 5B shows the circuit operation of the buck/boost converter in the first embodiment.

With reference to FIG. 5B, in the negative half cycle of the single-phase utility system, the first power electronic switch (S1) and the fourth power electronic switch (S4) remain off. However, the diode of the fourth power electronic switch (S4) still functions. The second power electronic switch (S2) continues to turn on and forms a short circuit. The DC to AC inverter operates as a buck/boost converter (30) as shown in FIG. 5B. The third power electronic switch (S3) is controlled to be turned on and off alternately at high frequency. When the third power electronic switch (S3) is turned on, the DC source provides energy to the energy storage inductor (L) to store energy. The current on the energy storage inductor (L) increases. When the third power electronic switch (S3) is turned off, the diode of the fourth power electronic switch (S4) is short due to the forward bias. The energy storage inductor (L) releases energy to the single-phase utility system via the diode of the fourth power electronic switch (S4). The current on the energy storage inductor (L) then drops. Due to the current flowing direction of the energy storage inductor (L), the current into the single-phase utility system turns to be negative. Therefore, using the high-frequency PWM technique to control the third power electronic switch (S3) can generate negative half-cycle signal of the AC sinusoidal current transmitted into the single-phase utility system.

Figure 6:
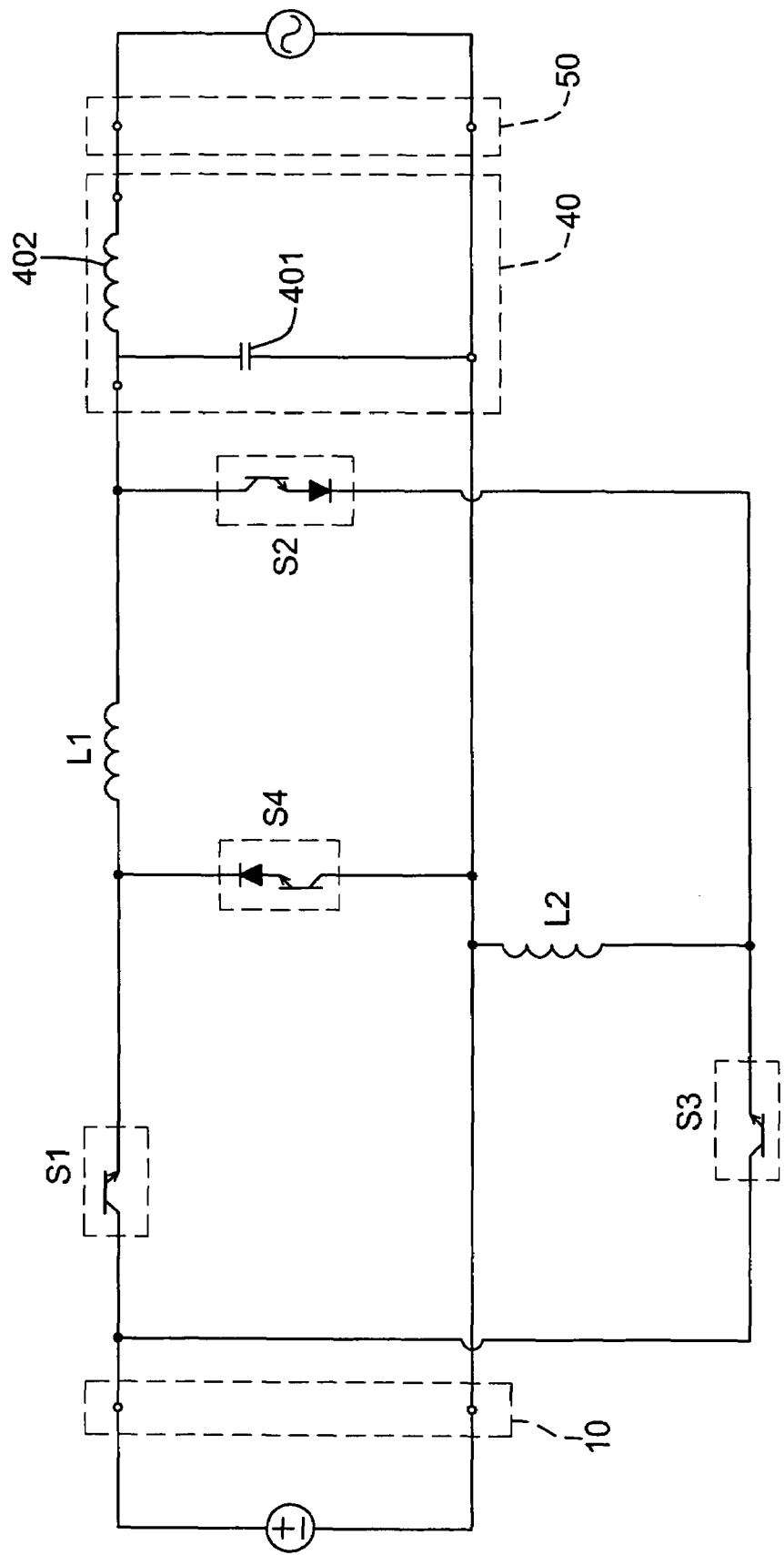
FIG. 6 is a circuit diagram of a second embodiment of the DC to AC inverter of the present invention.

With reference to FIG. 6, a second embodiment of the DC to AC inverter is shown. The buck converting circuit of the buck converter (20) and the buck/boost converting circuit of the buck/boost converter (30) comprise first to fourth power electronic switches (S1)-(S4), a first energy storage inductor (L1), and a second energy storage inductor (L2). In particular, each of the second power electronic switch (S2) and the fourth power electronic switch (S4) is formed by a power electronic switch and a diode in series.

A first end of the first power electronic switch (S1) is connected to the positive input terminal of the DC power input port (10). A second end of the first power electronic switch (S1) is connected to a second end of the fourth power electronic switch (S4) and the first end of the first energy storage inductor (L1). The first end of the fourth power electronic switch (S4) is connected to the negative input terminal of the DC power input port (10). A first end of the third power electronic switch (S3) is connected to the positive input terminal of the DC power input port (10). A second end of the third power electronic switch (S3) is connected to a first terminal of the second energy storage inductor (L2) and a second end of the second power electronic switch (S2). A second end of the second energy storage inductor (L2) is connected to the negative input terminal of the DC power input port (10). A first end of the second power electronic switch (S2) is connected to a second end of the first energy storage inductor (L1) and the input terminal of the output filter (40). The common terminal of the output filter (40) is connected to the negative input terminal of the DC power input port (10). The output terminal and the common terminal of the output filter (40) are connected to the AC output port (50). The AC output port (50) is connected to the single-phase utility system via two power lines. One of the power lines is a neutral line connected to the ground in the single-phase utility system.

As shown in FIG. 6, the neutral line of the single-phase utility system is directly connected to the negative terminal of the DC source. That is, in the second embodiment of the invention, the negative terminal of the DC source and the neutral line of the single-phase utility system have an equal voltage potential.

The second embodiment appropriately controls the on and off sequence of the first to fourth power electronic switches (S1)-(S4) so that the foregoing circuit is selectively operated as the buck converter (20) or the buck/boost converter (30). The output power of the DC source is converted to AC power being injected into the single-phase utility system. The AC power, in the form of outputting a sinusoidal current with the same phase as the voltage of the utility system, is injected into the single-phase utility system. In this embodiment, the first power electronic switch (S1) and the third power electronic switch (S3) are controlled by the high-frequency PWM technique in the positive and negative half cycles of the single-phase utility system respectively. Only one power electronic switch is controlled by high-frequency PWM and switched in high frequency at the same time. The second power electronic switch (S2) and the fourth power electronic switch (S4) are controlled by square waves synchronously with the voltage of the single-phase utility system. The actions of two converters are detailed below.

A. Buck Converter

Figure 7A:
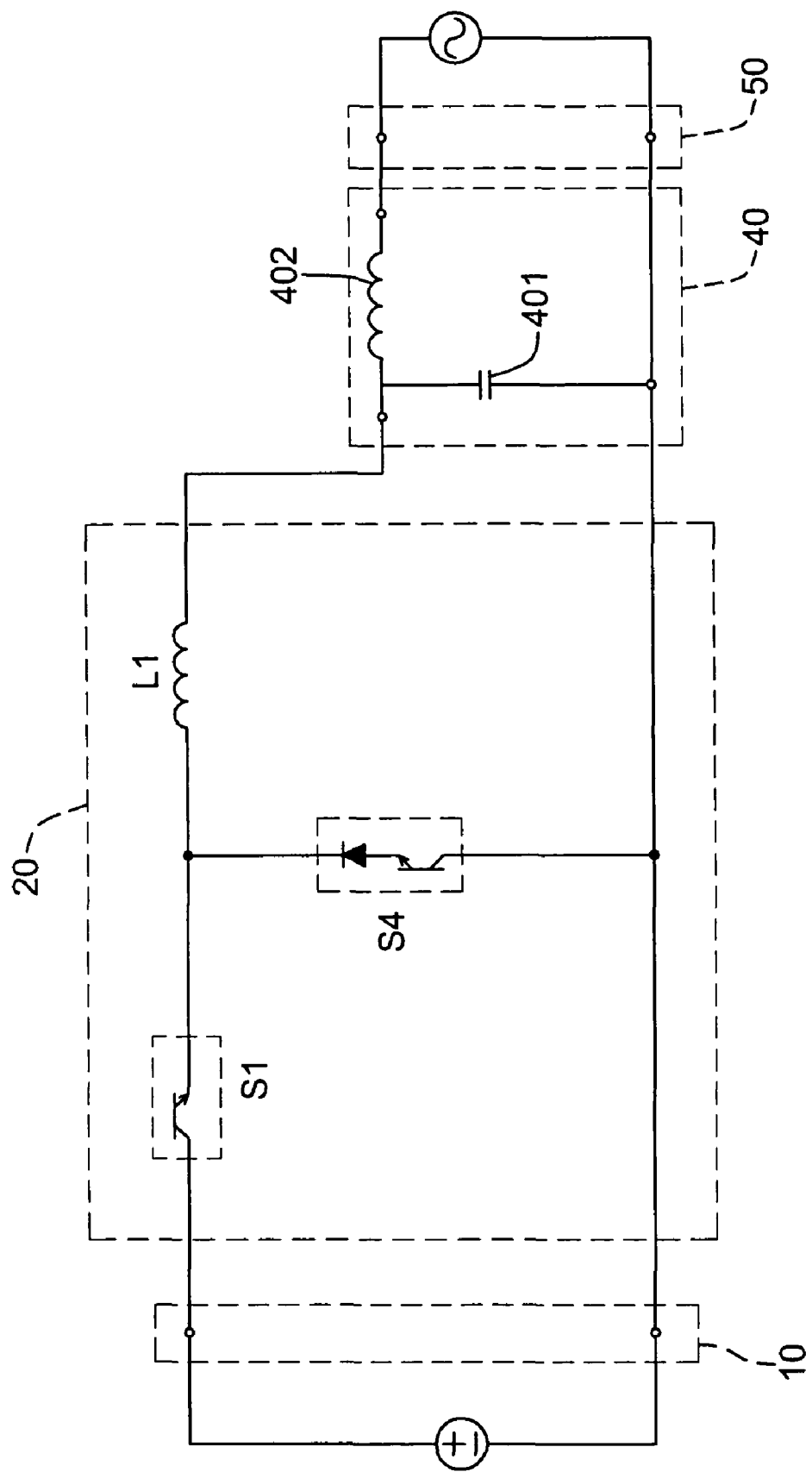
FIG. 7A shows the circuit operation of the buck converter in the second embodiment.

With reference to FIG. 7A, in the positive half cycle of the single-phase utility system, the second power electronic switch (S2) and the third power electronic switch (S3) remain off, equivalent to an open circuit. The power electronic switch of the fourth power electronic switch (S4) remains on so that the DC to AC inverter is operated as the buck converter (20) shown in FIG. 7A. In FIG. 7A, the first power electronic switch (S1) is controlled to alternately turn on and off at a high frequency. When the first power electronic switch (S1) is turned on, the diode of the fourth power electronic switch (S4) is open due to a reversed bias. Since the voltage of the DC source is always larger than the voltage amplitude of the single-phase utility system, the DC source provides energy for the first energy storage inductor (L1) to store energy and to supply the single-phase utility system. The current on the first energy storage inductor (L1) thus increases. When the first power electronic switch (S1) is turned off, the diode of the fourth power electronic switch (S4) is short because of the forward bias. The first energy storage inductor (L1) then releases energy to supply the single-phase utility system via the fourth power electronic switch (S4). The current on the first energy storage inductor (L1) thus drops. Therefore, using the high-frequency PWM technique on the first power electronic switch (S1) can generate positive half-cycle signal of the sinusoidal current being injected into the single-phase utility system when the utility voltage is in the positive half cycle.

B. Buck/Boost Converter

Figure 7B:
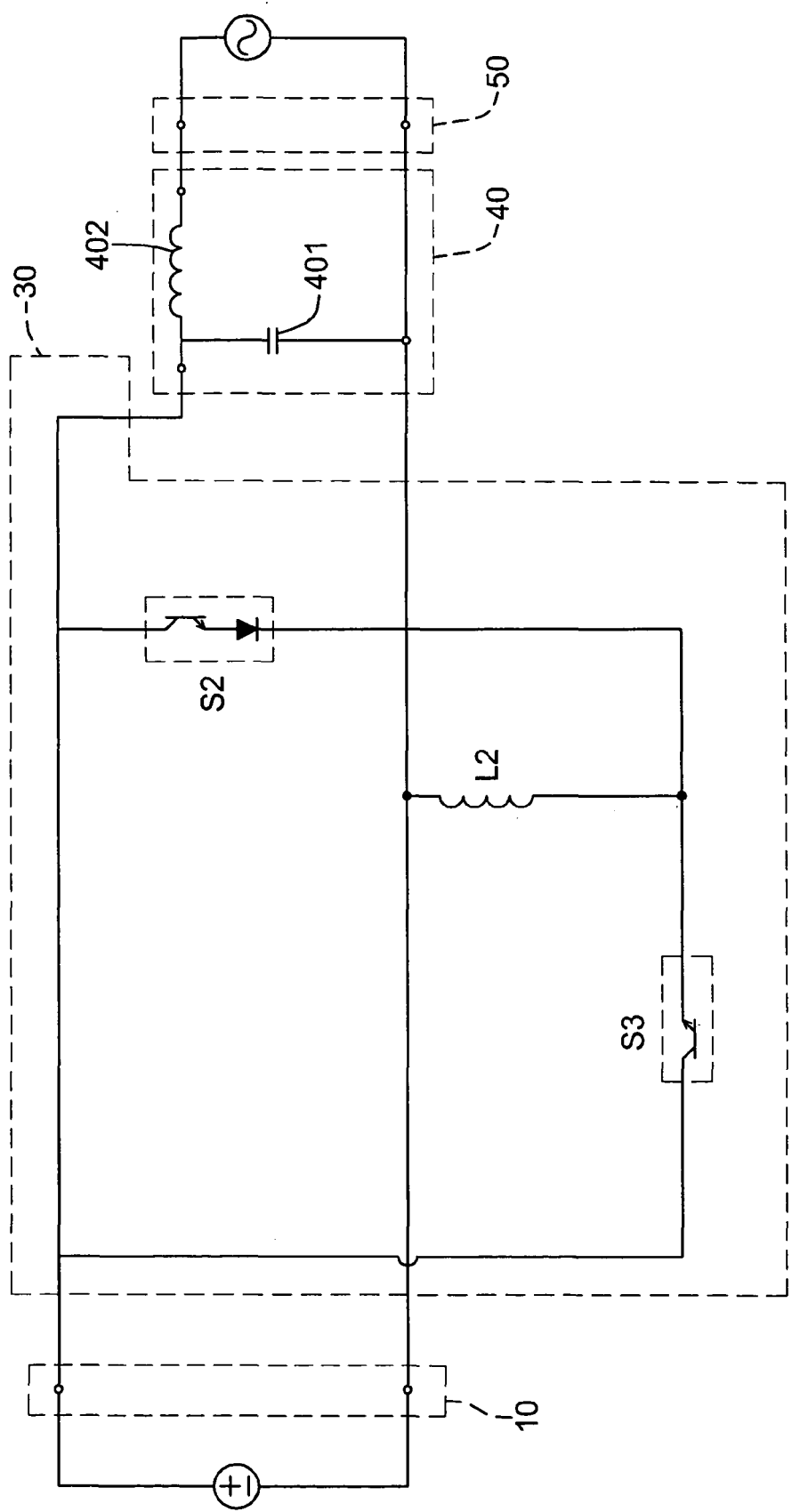
FIG. 7B shows the circuit operation of the buck/boost converter in the second embodiment.

With reference to FIG. 7B, in the negative half cycle of the single-phase utility system, the first power electronic switch (S1) and the fourth power electronic switch (S4) remain off, equivalent to an open circuit. The power electronic switch of the second power electronic switch (S2) remains on so that the DC to AC inverter is operated as a buck/boost converter (30), as shown in FIG. 7B. The third power electronic switch (S3) is controlled to alternately turn on and off at a high frequency. When the third power electronic switch (S3) is turned on, the diode of the second power electronic switch (S2) is open because of the reversed bias. The DC source provides energy for the second energy storage inductor (L2) to store energy. The current on the second energy storage inductor (L2) increases. When the third power electronic switch (S3) is turned off, the diode of the second power electronic switch (S2) is short due to the forward bias. The second energy storage inductor (L2) then releases energy to the single-phase utility system via the second power electronic switch (S2). The current on the second energy storage inductor (L2) thus drops. Due to the current flowing direction of the second energy storage inductor (L2), the current flowing into the single-phase utility system is negative. Therefore, using the high-frequency PWM technique on the third power electronic switch (S3) can generate negative half-cycle signal of the sinusoidal current being injected into the single-phase utility system when the utility voltage is in negative half cycle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A DC to AC inverter comprising:
   a DC power input port having a positive input terminal and a negative input terminal, both connected to a DC source;
   a buck converter comprising a buck converting circuit, an input terminal, a common terminal and an output terminal, with the input terminal and the common terminal connected to the positive input terminal and the negative input terminal of the DC power input port respectively;
   a buck/boost converter comprising a buck/boost converting circuit, an input terminal, a common terminal and an output terminal, wherein the input terminal, the common terminal and the output terminal of the buck/boost converter are connected to the input terminal, the common terminal and the output terminal of the buck converter respectively;
   an output filter comprising a filtering circuit, an input terminal, an output terminal and a common terminal, wherein the input terminal and the common terminal of the output filter are connected to the output terminal and the common terminal of the buck converter respectively; and
   an AC output port comprising an output terminal and a common terminal, wherein the output terminal and the common terminal of the AC output port are connected to the output terminal and the common terminal of the output filter respectively, the AC output port functions as an output of the DC to AC inverter and is connected to a single-phase utility system, and the common terminal of the AC output port is connected to a neutral line of the single-phase utility system;
   wherein the buck converter and the buck/boost converter operate alternately to generate an AC sinusoidal current transmitted to the single-phase utility system via the output filter and the AC output port, the buck converter produces a positive half cycle signal of the sinusoidal current when the single-phase utility system is in positive half cycle, and the buck/boost converter produces a negative half cycle signal of the sinusoidal current when the single-phase utility system is in negative half cycle.

2. The DC to AC inverter as claimed in claim 1, wherein the filtering circuit of the output filter comprises a capacitor and an inductor for filtering out high-frequency harmonics produced by the buck converter and the buck/boost converter, the capacitor is connected between the input terminal and the common terminal of the output filter and the inductor is connected between the input terminal and the output terminal of the output filter.

3. The DC to AC inverter as claimed in claim 1, the buck converting circuit of the buck converter and the buck/boost converting circuit of the buck/boost converter comprising a first power electronic switch, a second power electronic switch, a third power electronic switch, a fourth power electronic switch, a diode and an energy storage inductor, each of the power electronic switches, the diode and the energy storage inductor has a first end and a second end; wherein the first end of the first power electronic switch is connected to the positive input terminal of the DC power input port, and the second end of the first power electronic switch is connected to the first end of the second power electronic switch, the second end of the diode, and the first end of the energy storage inductor;

the second end of the second power electronic switch and the first end of the diode are connected together, and thereafter connected to the negative input terminal of the DC power input port;

the first end of the third power electronic switch is connected to the positive input terminal of the DC power input port, and the second end of the third power electronic switch is connected to the second end of the energy storage inductor and the first end of the fourth power electronic switch; and the second end of the fourth power electronic switch is connected to the input terminal of the output filter.

4. The DC to AC inverter as claimed in claim 3, wherein each of the first power electronic switch, the second power electronic switch and the third power electronic switch is a power electronic switch, and the fourth power electronic switch is composed of a power electronic switch and a diode connected in parallel.

5. The DC to AC inverter as claimed in claim 3, wherein the buck converter is operated when the second power electronic switch and the third power electronic switch remain off, only the first power electronic switch is controlled to alternately turn on and off at a high frequency, and the fourth power electronic switch remains on; and the buck/boost converter is operated when the first power electronic switch and the fourth power electronic switch remain off, only the third power electronic switch is controlled to alternately turn on and off at a high frequency, and the second power electronic switch remains on.

6. The DC to AC inverter as claimed in claim 1, the buck converting circuit of the buck converter and the buck/boost converting circuit of the buck/boost converter comprising a first power electronic switch, a second power electronic switch, a third power electronic switch, a fourth power electronic switch, a first energy storage inductor, and a second energy storage inductor, wherein each of the four power electronic switches and the two energy storage inductors has a first end and a second end; wherein the first end of the first power electronic switch is connected to the positive input terminal of the DC power input port, and the second end of the first power electronic switch is connected to the second end of the fourth power electronic switch and the first end of the first energy storage inductor;

the first end of the fourth power electronic switch is connected to the negative input terminal of the DC power input port;

the first end of the third power electronic switch is connected to the positive input terminal of the DC power input port, the second end of the third power electronic switch is connected to the first end of the second energy storage inductor and the second end of the second power electronic switch, and the second end of the second energy storage inductor is connected to the negative input terminal of the DC input port; and the first end of the second power electronic switch is connected to the second end of the first energy storage inductor and the input terminal of the output filter.

7. The DC to AC inverter as claimed in claim 6, wherein each of the first power electronic switch and the third power electronic switch is a power electronic switch, and each of the second power electronic switch and the fourth power electronic switch is formed of a power electronic switch and a diode in series.

8. The DC to AC inverter as claimed in claim 6, wherein the buck converter is operated when the second power electronic switch and the third power electronic switch remain off, only the first power electronic switch is controlled to alternately turn on and off at a high frequency, and the fourth power electronic switch remains on; and the buck/boost converter is operated when the first power electronic switch and the fourth power electronic switch remain off, only the third power electronic switch is controlled to alternately turn on and off at a high frequency, and the second power electronic switch remains on.

9. The DC to AC inverter as claimed in claim 3, wherein the first power electronic switch and the third power electronic switch are respectively controlled by adapting high-frequency PWM technique during the positive and negative half cycles of the single-phase utility system, and only one power electronic switch is switched in high frequency at the same time; and the second power electronic switch and the fourth power electronic switch are controlled by adapting square waves being synchronous with the voltage of the single-phase utility system.

10. The DC to AC inverter as claimed in claim 6, wherein the first power electronic switch and the third power electronic switch are respectively controlled by adapting high-frequency PWM technique during the positive and negative half cycles of the single-phase utility system, and only one power electronic switch is switched in high frequency at the same time; and the second power electronic switch and the fourth power electronic switch are controlled by utilizing square waves being synchronous with the voltage of the single-phase utility system.

* * * * *